UNITED STATES PATENT OFFICE.

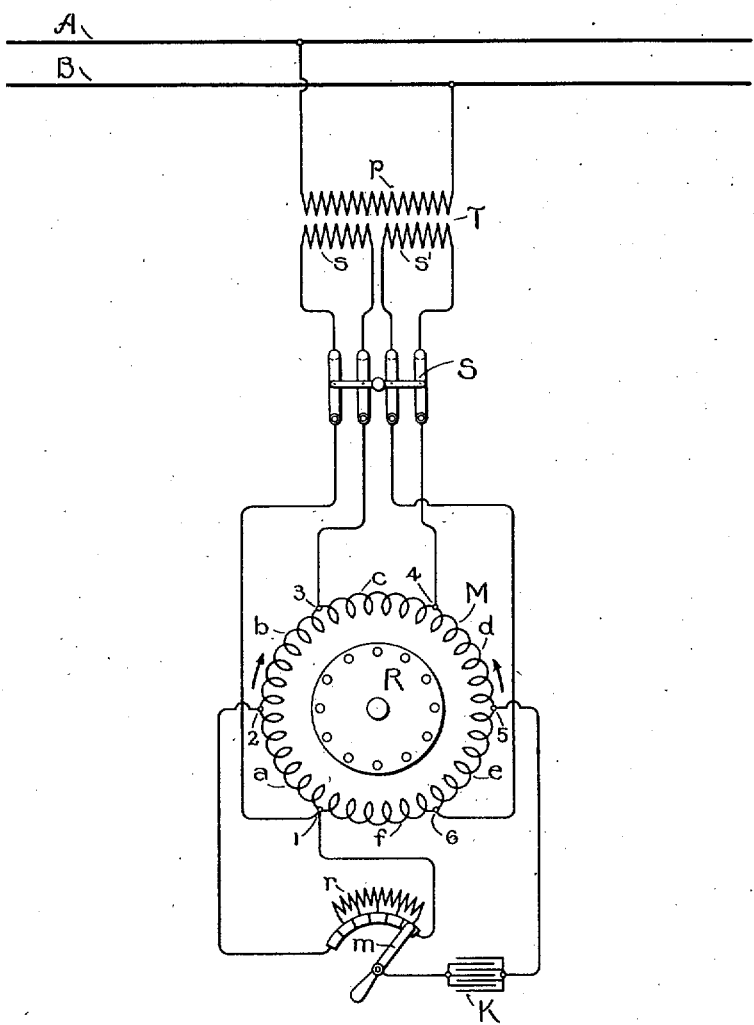

ERNST J. BERG, OF SCHENECTADY, NEW YORK, ASSIGNOR TO GENERAL ELECTRIC COMPANY, A CORPORATION OF NEW YORK.

ALTERNATING-CURRENT MOTOR.

No. 847,153.      Specification of Letters Patent.      Patented March 12, 1907.

Application filed December 19, 1903. Serial No. 185,792.

*To all whom it may concern:*

Be it known that I, ERNST J. BERG, a citizen of the United States, residing at Schenectady, county of Schenectady, State of New York, have invented certain new and useful Improvements in Alternating-Current Motors, of which the following is a specification.

My invention relates to induction-motors operated from single-phase sources of supply, and has for its object the improvement of the output, torque, power factor, and efficiency of such motors. In patents to Charles P. Steinmetz, Nos. 602,920 and 602,921, issued April 26, 1898, is shown and described a motor designed to be operated from a single-phase source having primary windings angularly displaced from each other by one hundred and twenty degrees, as is the custom in motors operated from three-phase circuits, connected in delta. Across one side of said delta the supply-mains are connected, and across another side is connected a condenser. This connection gives good starting conditions, and I propose to employ a similar connection at starting; but I have found that other connections and arrangement of apparatus give better running conditions.

My invention can best be described in connection with the annexed drawings, which is a diagram illustrating the connections and arrangement of one of its applications.

Referring to the drawing, A and B are mains connected with a single-phase source of supply, across which is connected the primary $p$ of transformer T. $s$ and $s'$ are the secondaries of the transformer, and they have an equal number of turns, thus causing the voltage induced in them by the primary to be equal. The ratio of turns in the secondaries to those of the primary can be made any that is desired and so the voltage delivered by the secondaries can be made to bear any desired relation to that of the source.

M represents a motor having the rotor R, which may be of the squirrel-cage or any other well-known type, and a field-winding, which is continuous, but has six taps brought out from it. Thus six sections $a$ $b$ $c$, &c., are formed, which taken in pairs constitute a three-phase winding or singly a six-phase winding. It will be seen that the secondary $s$ of transformer T is connected across the sections $a$ and $b$, which correspond to one side of the delta of a three-phase winding.

K is a quadrature device consisting of a condenser, which is connected through switch member $m$, across sections $e$ and $f$, which form a second side of a three-phase delta. Thus if transformer secondary $s$ is energized and condenser K is connected, as shown, the motor has precisely the arrangement of the Steinmetz motors above referred to and good starting torque is obtained.

In order to secure greater torque and efficiency under running conditions, the transformer secondary $s'$ is connected to taps 4 and 6 across sections $d$ and $e$. Thus two parts of the winding one hundred and eighty electrical degrees apart are energized by the two transformer secondaries $s$ and $s'$. The relative directions of the currents in the two parts at any moment are indicated by the arrows, it being understood that the direction of both arrows is periodically reversed. By thus directly energizing these two parts of the winding practically all the winding is made efficient in producing a useful torque. The sections $c$ and $f$, which because of their position could exert little useful torque, are not connected in circuit, and consequently any voltage drop through these parts is avoided.

Although the connection of the condenser as shown in the drawing is suitable for producing a good starting torque, I have discovered that the power factor and efficiency of the motor may be increased under running conditions if the condenser is connected across a part of the winding displaced ninety degrees instead of one hundred and twenty degrees from the magnetizing-winding. One feature of my invention consists in shifting the connection of one terminal of the condenser from tap 1 to tap 2, thereby including section $a$ in addition to sections $e$ and $f$, thus placing the condenser across a part of the winding displaced ninety electrical degrees from the magnetizing-windings $a$ $b$ and $d$ $e$. To accomplish this shifting of the condenser connections is the purpose of switch member $m$ and a regulating-resistance $r$. Switch member $m$ is arranged to engage switch-contacts to which resistance $r$ is connected. As the motor speeds up and as switch member $m$ is moved from right to left parts of resistance $r$ are progressively placed in series with condenser K, thereby gradually decreasing the condenser-current. When switch member $m$ reaches the extreme left-hand switch-contact, resistance $r$ is cut out of circuit and the condenser is connected directly to tap 2. Thus the proper connection of the condenser for obtaining a large starting torque is obtained in combination with the proper connection of the condenser for obtaining a high-power factor and maximum efficiency under running conditions.

Although for the sake of simplicity I have shown a bipolar motor provided with a Gramme-ring winding, nevertheless it will be understood that my invention is in no way limited to this particular form of motor, but may be applied to a motor having any number of poles and any well-known form of winding.

Accordingly I do not desire to limit myself to the particular construction and arrangement of parts here shown, since changes therein which do not depart from the spirit of my invention and which are within the scope of the appended claims will be obvious to those skilled in the art.

What I claim as new, and desire to secure by Letters Patent of the United States, is—

1. In combination, an induction-motor having a continuous winding, a source of current connected to a part of said winding, a condenser connected in a certain relation to said winding at starting, and means for shifting the connections of said condenser to a part of said winding displaced ninety electrical degrees from the part of said winding connected to said source.

2. In combination, an induction-motor having a continuous winding, a source of current connected across one-third of said winding, a condenser connected across an adjacent third, and means for shifting the connections of said condenser to include half of the first-named third.

3. In combination, an induction-motor having a three-phase winding, a source of current connected to one phase of said winding, a condenser, and means for connecting said condenser to a second phase of said winding and for then shifting the connection of one terminal of said condenser from the end to the middle of the first-named phase.

4. In combination, an induction-motor having a continuous winding, independent sources of current connected to energize two parts of said winding displaced from each other one hundred and eighty electrical degrees, a condenser, and means for connecting said condenser to the middle of one of said parts and to the end of the other of said parts, and then connecting said condenser to the middle of both parts.

5. In combination, an induction-motor having a continuous winding, a single-phase source of supply, two independent supply-circuits derived therefrom and connected respectively to two parts of said winding displaced from each other one hundred and eighty electrical degrees, a condenser, and means for connecting said condenser variably to said windings.

6. In combination, an induction-motor, a single-phase source of supply, supply-circuits derived therefrom and connected to the windings of said motor, a phase-advancing device connected in a certain relation to said windings at starting, and means for changing the connections of said device to said windings when the motor is running.

7. In combination, an induction-motor having a winding in six sections connected to form a continuous winding, two independent supply-circuits each connected to a pair of adjacent sections and said pairs being displaced from each other one hundred and eighty electrical degrees, a condenser having one terminal connected to the middle point of one of said pairs, and means for variably connecting the other condenser-terminal to the end or to the middle point of the second of said pairs.

8. In combination, an induction-motor, a condenser having one terminal permanently connected to a point on the winding of said motor, means for connecting the other terminal of the condenser to one point on said winding when said motor is starting and to another point when said motor is running, and means for inserting a resistance in series with said condenser when changing the connection of said terminal.

9. In combination, an induction-motor, a single-phase source of supply, independent supply-circuits derived therefrom and connected to the windings of said motor, a condenser, and means for variably connecting said condenser to the windings of said motor.

10. The combination with an alternating-current machine, and a single-phase circuit connected therewith, of a quadrature device connected with the primary element of the machine, the connections thereof being at an angle to those of the single-phase circuit, and means for shifting the connections of the quadrature device.

11. The combination with an alternating-current machine, and a single-phase circuit connected therewith, of a condenser connected with the primary element of the machine, and means for shifting the connections of the condenser relative to the connections of the single-phase circuit.

12. The combination with an alternating-current machine, and a single-phase circuit connected therewith, of a quadrature device connected with the primary element of the machine, and means for shifting the connections of the quadrature device relative to the connections of the single-phase circuit.

13. The combination with an alternating-current machine, and a single-phase circuit connected therewith, of a quadrature device connected with the primary element of the machine, the connections thereof being at an angle to those of the single-phase circuit, means for shifting the connections of the quadrature device, and means for regulating the current taken by the quadrature device.

14. The combination with an alternating-current machine, and a single-phase circuit connected therewith, of a quadrature device connected with the primary element of the machine, means for shifting the connections of the quadrature device relative to the connections of the single-phase circuit, and means for regulating the current taken by the quadrature device.

15. The combination with an alternating-current machine, and a single-phase circuit connected therewith, of a condenser connected with the primary element of the machine, the connections thereof being at an angle to those of the single-phase circuit, and means for shifting the connections of the condenser.

16. The combination with an alternating-current machine, and a single-phase circuit connected therewith, of a condenser connected with the primary element of the machine, the connections thereof being at an angle to those of the single-phase circuit, means for shifting the connections of the condenser, and means for regulating the current taken by the condenser.

17. The combination with an alternating-current machine, and a single-phase circuit connected therewith, of a condenser connected with the primary element of the machine, means for shifting the connections of the condenser relative to the connections of the single-phase circuit, and means for regulating the current taken by the condenser.

In witness whereof I have hereunto set my hand this 17th day of December, 1903.

ERNST J. BERG.

Witnesses:
BENJAMIN B. HULL,
HELEN ORFORD.